(12) United States Patent
Eckert et al.

(10) Patent No.: US 9,216,721 B2
(45) Date of Patent: Dec. 22, 2015

(54) METHOD FOR BRAKE CONTROL OF A VEHICLE COMBINATION AND BRAKE CONTROL UNIT FOR A TRACTOR VEHICLE

(71) Applicant: WABCO GmbH, Hannover (DE)

(72) Inventors: Horst Eckert, Rehburg-Loccum (DE); Arnd Gaulke, Wennigsen (DE)

(73) Assignee: WABCO GmbH, Hannover (DE)

( * ) Notice: Subject to any disclaimer, the term of this patent is extended or adjusted under 35 U.S.C. 154(b) by 78 days.

(21) Appl. No.: 14/104,181

(22) Filed: Dec. 12, 2013

(65) Prior Publication Data

US 2014/0180555 A1    Jun. 26, 2014

(30) Foreign Application Priority Data

Dec. 20, 2012  (DE) .......................... 10 2012 024 981

(51) Int. Cl.
| | |
|---|---|
| *B60T 8/18* | (2006.01) |
| *B60T 8/17* | (2006.01) |
| *B60T 8/176* | (2006.01) |
| *B60T 8/74* | (2006.01) |
| *B60T 8/1755* | (2006.01) |
| *B60T 8/1766* | (2006.01) |

(52) U.S. Cl.
CPC ............... *B60T 8/1887* (2013.01); *B60T 8/176* (2013.01); *B60T 8/1708* (2013.01); *B60T 8/1755* (2013.01); *B60T 8/1766* (2013.01); *B60T 8/74* (2013.01); *B60T 2240/06* (2013.01); *B60T 2250/02* (2013.01)

(58) Field of Classification Search
CPC ..... B60T 8/1708; B60T 8/1755; B60T 8/176; B60T 8/1766; B60T 8/1887

USPC .................................................... 701/79, 124
See application file for complete search history.

(56) References Cited

U.S. PATENT DOCUMENTS

| | | |
|---|---|---|
| 7,134,733 B2 | 11/2006 | Eckert et al. |
| 8,267,485 B2 | 9/2012 | Barlsen et al. |

FOREIGN PATENT DOCUMENTS

| | | |
|---|---|---|
| DE | 102 61 513 | 1/2004 |
| DE | 10 2008 022 026 | 5/2009 |

*Primary Examiner* — John Q Nguyen
*Assistant Examiner* — Nadeem Odeh
(74) *Attorney, Agent, or Firm* — Kramer Levin Naftalis & Frankel LLP

(57) ABSTRACT

In a method for controlling the brakes of a vehicle combination having a tractor equipped with an electronically controlled brake system, at least one front axle and one rear axle, and a trailer having at least one trailer axle, in the event of a brake actuation, a deceleration setpoint value is ascertained and compared to a deceleration actual value, and a current brake-application energy reference value is ascertained therefrom. Brake-application energy setpoint values for the tractor and trailer are ascertained from the current brake-application energy reference value and brake-application energy levels for the tractor and trailer while using stored characteristic maps, which illustrate the dependencies of the brake-application energy levels on the brake-application energy reference value or on the axle load distribution of the tractor. The characteristic maps are obtained as a function of at least one pre-definable influencing factor. For this, a loading state of the tractor and/or of the trailer and/or the vehicle combination is ascertained.

12 Claims, 15 Drawing Sheets

METHOD FOR BRAKE CONTROL OF A VEHICLE COMBINATION AND BRAKE CONTROL UNIT FOR A TRACTOR VEHICLE

CROSS-REFERENCE TO RELATED APPLICATION

This application claims the benefit of DE 10 2012 024 981.0 filed on Dec. 20, 2012, the disclosure of which is incorporated herein by reference in its entirety.

FIELD OF THE INVENTION

The present invention generally relates to a brake control method for a vehicle combination having a tractor vehicle equipped with an electronically controlled brake system, and a trailer vehicle, and also a control unit for the tractor vehicle.

BACKGROUND OF THE INVENTION

Applicant's DE 102 61 513 A1 (which corresponds to U.S. Pat. No. 7,134,733), describes a method of the general type under consideration in which, in the event of a brake, pedal actuation, a deceleration setpoint value is ascertained and compared to a current deceleration actual valise, and a brake-application energy reference value Kappa (also called BDN) is ascertained from the comparison. Furthermore, the brake-application energy setpoint values (brake pressure setpoint values) are separately ascertained for the tractor vehicle and the trailer vehicle. For this purpose, the deceleration setpoint value, a value w dependent on the brake-application energy reference value Kappa as a function of Kappa, and brake-application energy levels (brake pressure levels) are ascertained separately for the tractor vehicle and the trailer vehicle. In determining these separate brake-application energy levels for the tractor vehicle and the trailer vehicle, stored characteristic maps are used, which illustrate the dependencies of the brake pressure levels of the tractor vehicle and the trailer vehicle on the brake-application energy reference value Kappa and/or on the axle load distribution.

SUMMARY OF THE INVENTION

Generally speaking, it is an object of the present invention to provide a method and a control unit for brake control of a vehicle combination, which, on the foundation of the available variables and measured values, enable precise braking also as a function of different loading states of the vehicle combination.

As used herein, an axle load of an axle of a partial vehicle, i.e., both of the tractor vehicle and also of the trailer vehicle, is understood as the static weight of the axle loading the wheels of the axle in the point of contact. The axle load distribution is the quotient of the axle load of the front axle of the tractor vehicle divided by the axle load of the rear axle of the tractor vehicle. The weight of a partial vehicle is the sum of its axle loads. The total weight of the vehicle combination is the current sum of the (static) axle loads of the partial vehicles. The permissible weight of the tractor vehicle, also total gross vehicle weight or technical gross vehicle weight, TGVW, is a fixed, generally legally established value, i.e., an upper limiting value.

The inventive embodiments are based on the concept of ascertaining, from variables already available using a method as taught in DE 102 61 513 A1, loading states of the individual vehicles, in particular, also of the individual axles of the vehicles of a vehicle combination. From the brake-application energy levels (brake pressure levels), it can be determined whether the tractor vehicle and the trailer vehicle are each empty or fully loaded. The brake-application energy level having the unit bar/g indicates how much pressure is to be input to achieve the braking effects, which is therefore finally dependent on the weight of the tractor vehicle and of the trailer vehicle. The weight of the tractor vehicle is composed of the sum of the axle loads of the tractor vehicle; the weight of the trailer vehicle is composed of the sum of the axle loads of the trailer vehicle. Loading states of the tractor vehicle and of the trailer vehicle can therefore be estimated from the brake-application energy levels, for example, by linear interpolation. Therefore, center of gravity locations of the two vehicles and also of the entire vehicle combination can be ascertained by the further available variable of the axle load distribution. Also, loading states of the individual axles can be determined.

Even loading states related to the axle load are ascertainable from already available variables and optionally further determinations. These loading states can subsequently be used for vehicle dynamics control, to activate or control the individual axles in accordance with their loading state.

It will be appreciated that, with the present invention, a higher stability in a vehicle pair and more precise setting, in particular of vehicle dynamics controls, can be achieved with relatively little additional expenditure. Therefore, high vehicle stabilities are also achievable in vehicle combinations in which the trailer vehicle does not have a separate automatic load-dependent brake force control.

Still other objects and advantages of the present invention will in past be obvious and will in part be apparent from the specification.

The present invention accordingly comprises the features of construction, combination of elements, arrangement of parts, and the various steps and the relation of one or more of such steps with respect to each of the others, all as exemplified in the constructions herein set forth, and the scope of the invention will be indicated in the claims.

BRIEF DESCRIPTION OF THE DRAWINGS

The invention is explained in greater detail below using exemplary embodiments on the basis of the accompanying drawings, in which.

LIST OF REFERENCE CHARACTERS

Figure 1:
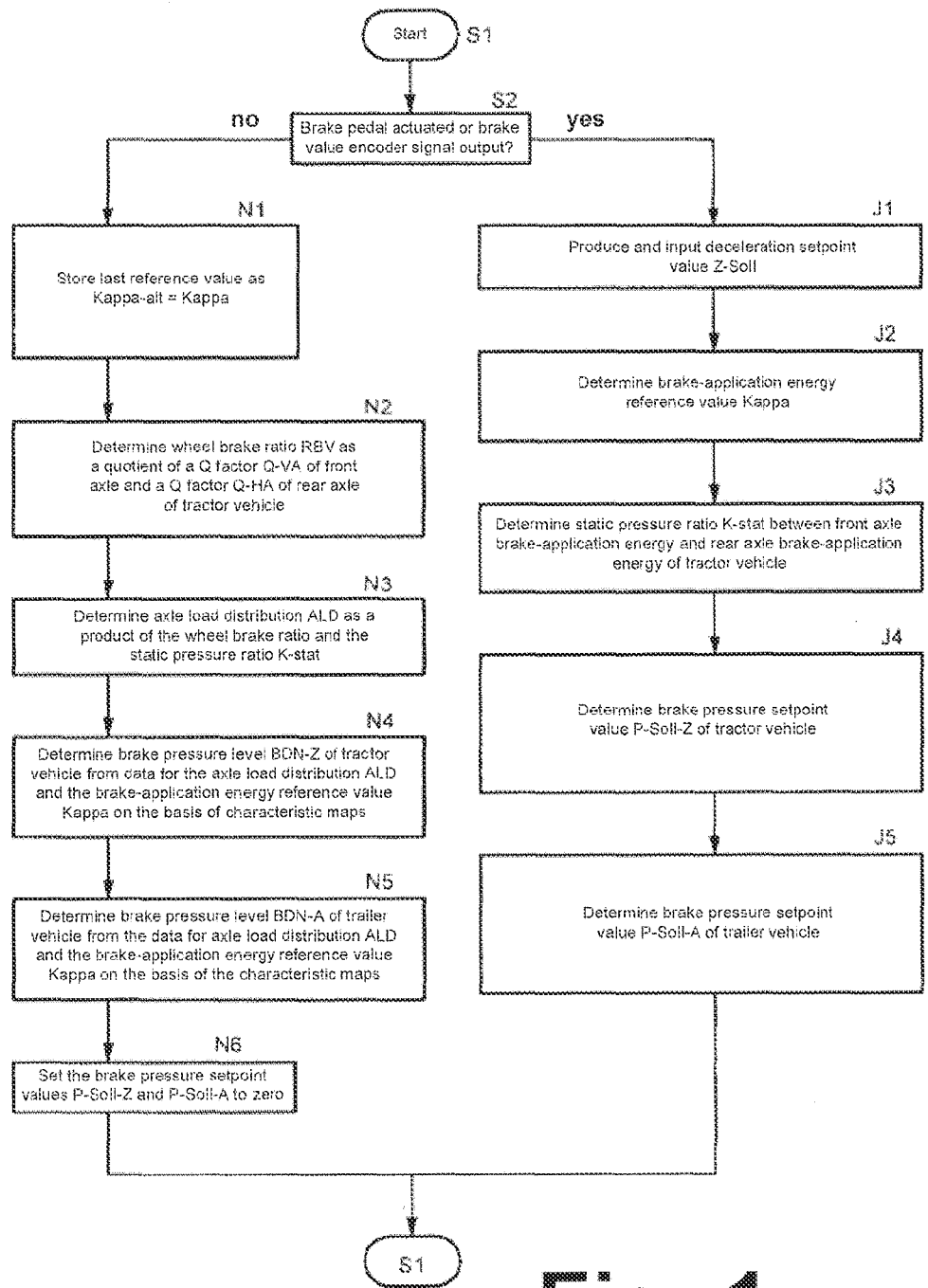
FIG. 1 is a flow chart illustrating a known method for ascertaining brake-application energy levels of a tractor vehicle and a trailer vehicle such as described in Applicant's DE 102 61 513 A1.

1 vehicle combination
2 tractor vehicle
3 trailer vehicle
4, 104, 204, 304, 404 brake control unit
5, 105, 205, 305, 405 EBS control unit
6, 106, 206, 306, 406 VDC control unit
7 calculation unit
AA1, AA2, AA3 first, second, third trailer axle of the trailer vehicle 3
   ALD axle load distribution of the tractor vehicle 2
   AL-ZVA axle load of the front axle of the tractor vehicle 2
   AL-ZHA axle load of the rear axle of the tractor vehicle 2
   AL-AA1 axle load of the first trailer axle
   AL-AA2 axle load of the second trailer axle
   E influencing factor (coupling factor)
   M total weight
   M-AFZ weight of the tractor vehicle 2
   M-ZFZ weight of the trailer vehicle 3
   Z-Soll-VDC vehicle deceleration setpoint value
   P-Soll-VA setpoint pressure
   P-Soll-HA setpoint pressure
   P-Soll-A setpoint pressure
   Z-Soll-VA-VDC axle-related deceleration setpoint value
   Z-Soll-HA-VDC axle-related deceleration setpoint value
   Z-Soll-A-VDC axle-related deceleration setpoint value
   P-Soll-Z brake pressure setpoint value
   P-Soll-A brake pressure setpoint value
   BDN-A brake-application energy level
   BDN-Z brake-application energy level
   S1 and s2 method steps
   N1-N6 method steps
   J1-J5 method steps

DETAILED DESCRIPTION OF THE PREFERRED EMBODIMENTS

FIG. 1 illustrates a method, which is fundamentally described in Applicant's DE 102 61 513 A1 (which corresponds to U.S. Pat. No. 7,134,733, and the disclosure of which is hereby incorporated herein by reference in its entirety), for ascertaining setpoint pressures for a tractor vehicle 2 and a trailer vehicle 3, wherein, according to FIGS. 2a and 2b, characteristic maps can be used, which illustrate the dependence of the brake-application energy level (brake pressure level) BDN-Z of the tractor vehicle 2 and the brake-application energy level (brake pressure level) BDN-A of the trailer vehicle 3 on a brake-application energy reference value Kappa and on axle load distribution ALD upon the application of different influencing factors, which distribute the braking work differently onto the partial vehicles.

Figure 2:
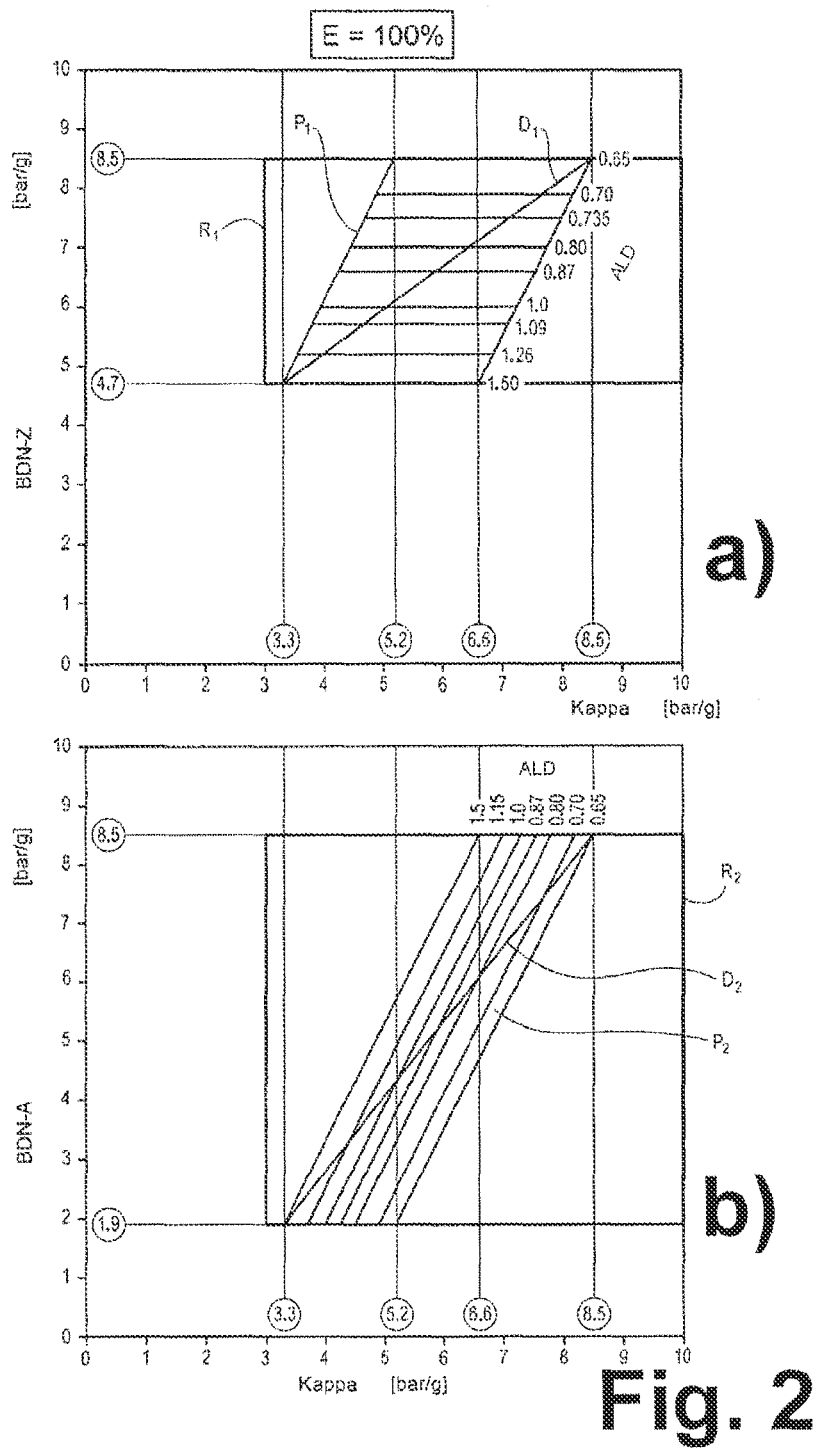
FIGS. 2a-2j are characteristic maps for the brake-application energy levels of the tractor vehicle and the trailer vehicle as a function of a brake-application energy-reference value Kappa and of an axle load distribution.
Figure 2:
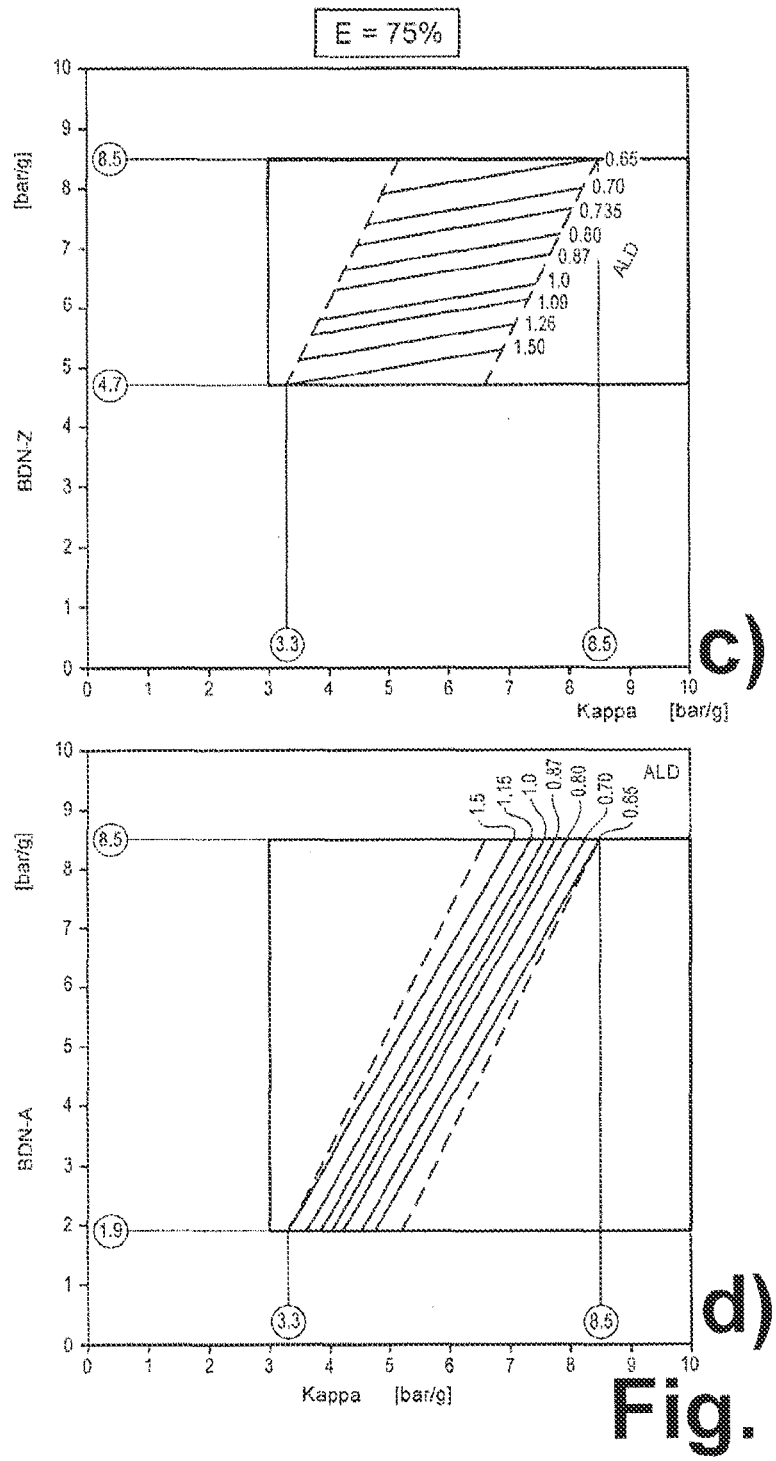
Figure 2:
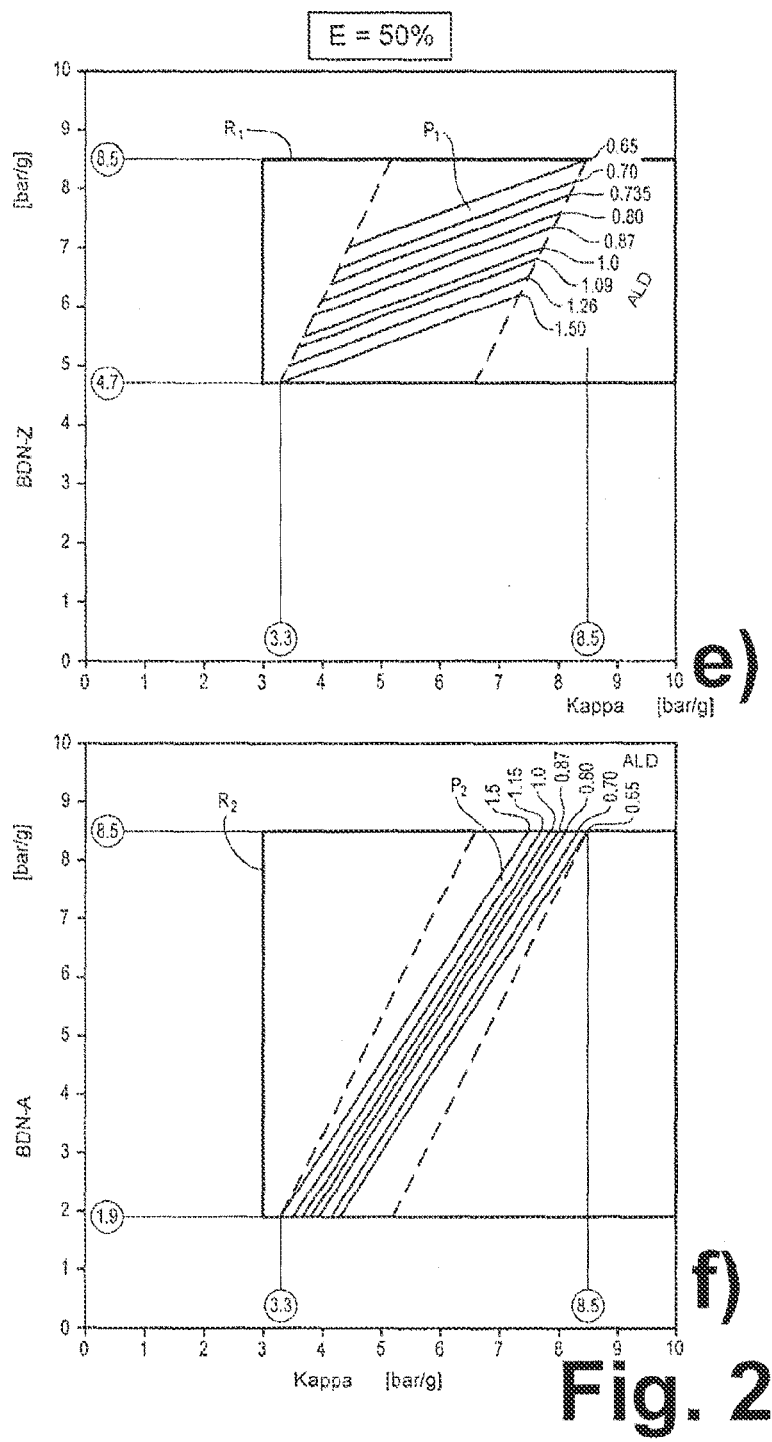
Figure 2:
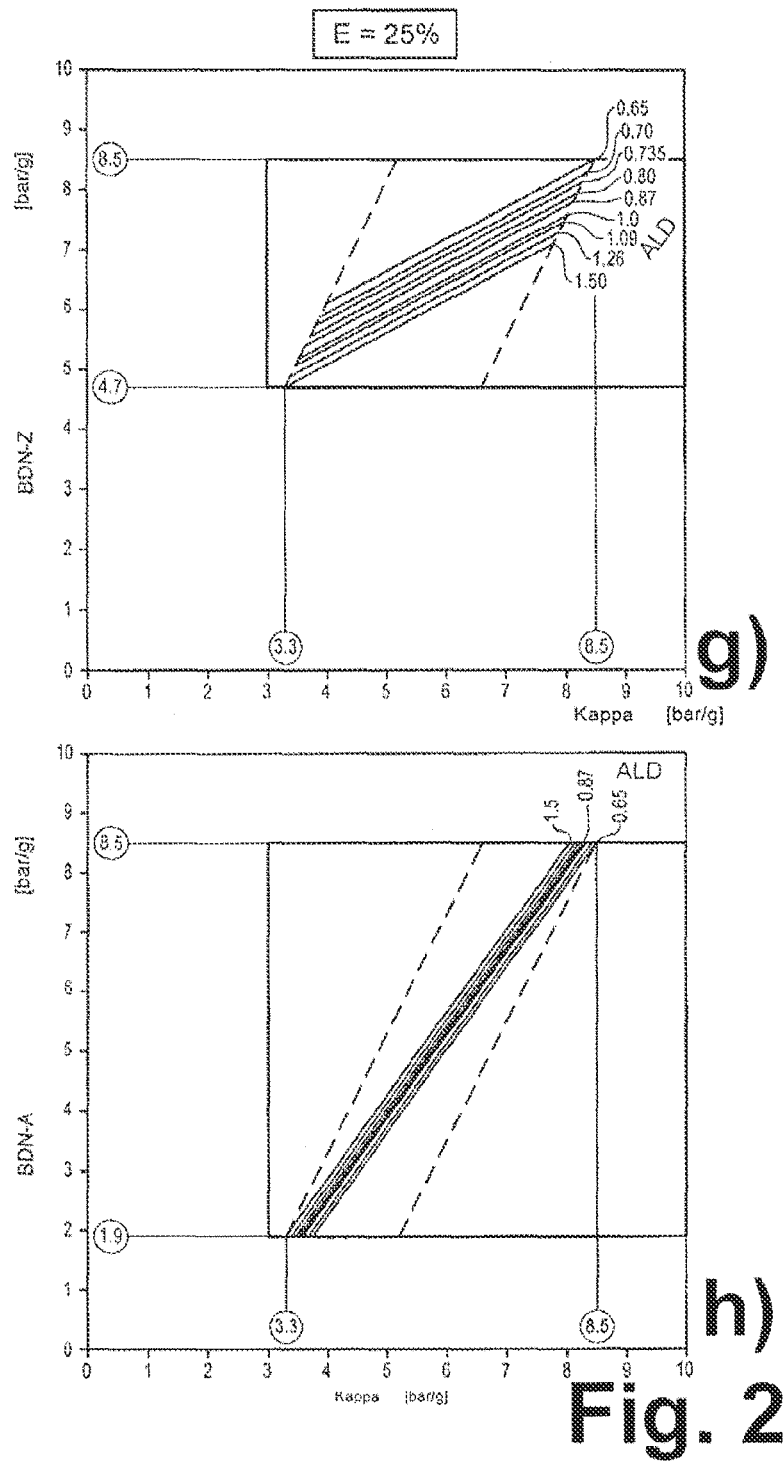
Figure 2:
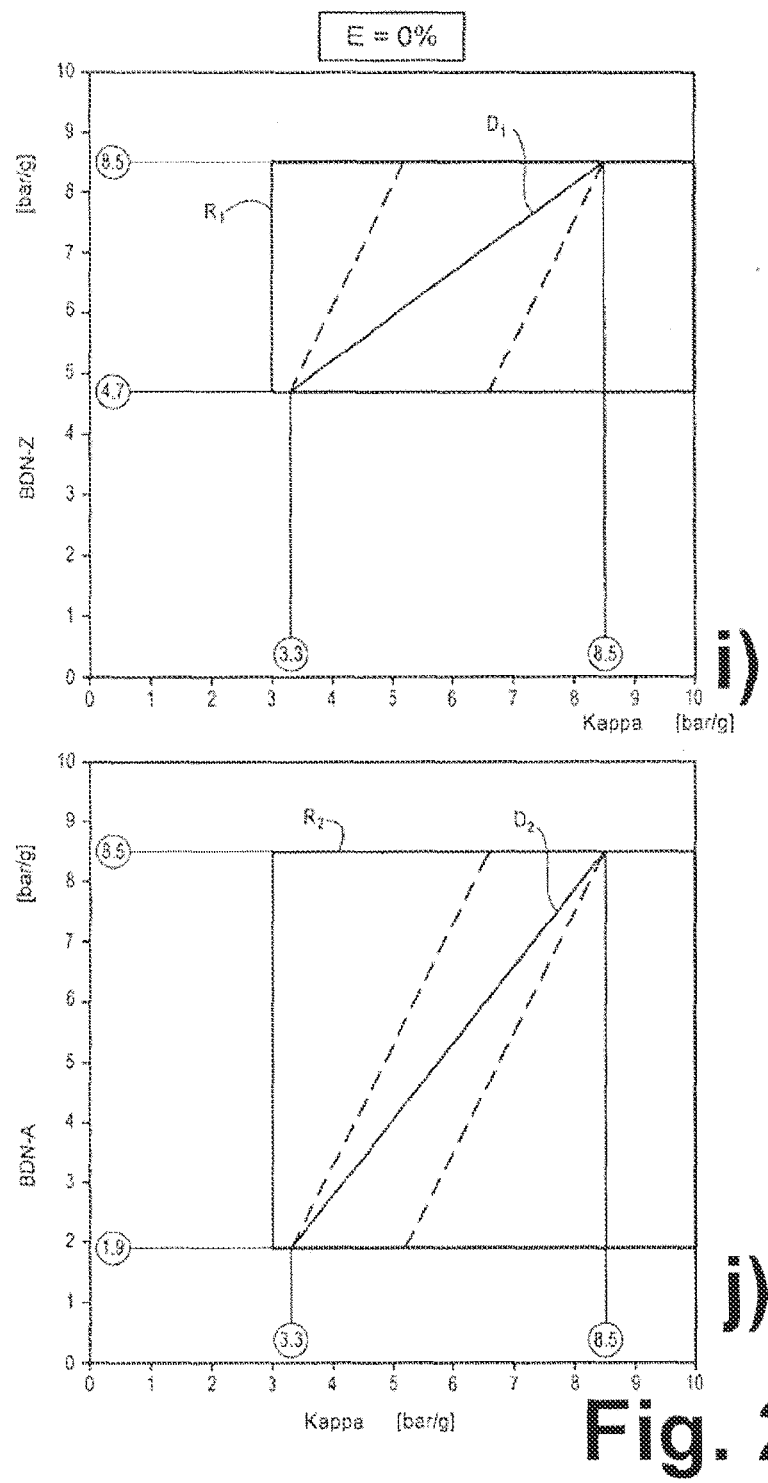

FIGS. 2a and 2b are exemplary characteristic maps for an influence factor of 100%.

Figure 10:
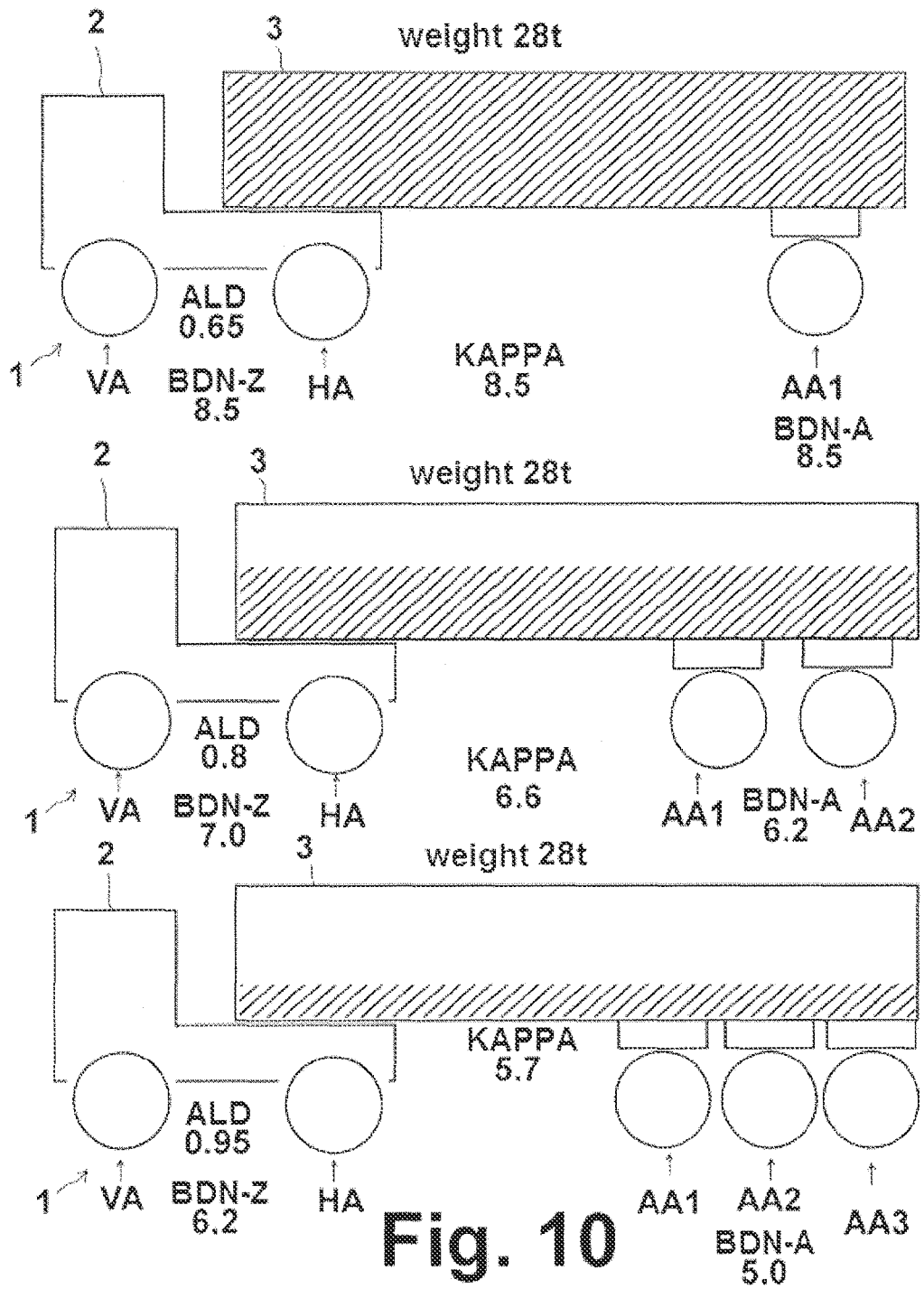
FIG. 10 shows a comparison of a vehicle combination having a trailer having respectively one axle, two axles, and three axles at a total weight of 28 t.

Accordingly, in the method illustrated in FIG. 1, a brake-application energy control or brake pressure level control of a vehicle combination 1 is used, which is also shown per se in FIG. 10, for example, and has a tractor vehicle 2, which is equipped with a brake system having EBS and VDC, and also a trailer vehicle 3. The tractor vehicle 2 and the partial vehicle 3 are designated hereafter more generally as "partial vehicles 2, 3".

In step S1, the method is started. Subsequently, in step S2, monitoring determines whether the brake pedal is actuated or a brake value encoder signal is output; if this is the case, according to step J1, a deceleration setpoint value Z-Soll is produced from the brake value encoder signal and input.

In step J2, the brake-application energy reference value Kappa is ascertained. The vehicle deceleration control ascertains the brake-application energy reference value Kappa from a comparison of the vehicle setpoint value Z-Soll with the deceleration actual value Z-Ist.

In step J3, a differential slip control DSC of the brake control unit 4 ascertains a static pressure ratio K-stat between the front axle brake-application energy and the rear axle brake-application energy as a brake-application energy ratio of the tractor vehicle 2. For this purpose, reference can be made, for example, to the algorithm described in EP 0 445 575 B1.

In step J4, the brake pressure setpoint value (brake-application energy setpoint value) P-Soll-Z of the tractor vehicle 2 is ascertained from the equation;

$$P\text{-}Soll\text{-}Z \sim Z \sim BDN\text{-}Z * Z\text{-}Soll * (\text{Kappa}/\text{Kappa-alt})$$

In step J5, the brake pressure setpoint value (brake-application energy setpoint value) P-Soll-A of the trailer vehicle 3 is ascertained from the equation:

$$P\text{-}Soll \sim A \sim BDN\text{-}A * Z\text{-}Soll * (\text{Kappa}/\text{Kappa-alt})$$

The values of BDN-Z, BDN-A, and Kappa are each specified in bar/g, wherein the numerator stands for the unit of pressure and the denominator stands for the gravitational acceleration of 9.81 m/s$^2$, i.e., the values respectively express how much brake pressure is necessary to achieve a deceleration (negative acceleration) corresponding to the gravitational acceleration of 9.81 m/s$^2$ (equal to 1 g).

If no actuation of the brake is ascertained in step S2, in step N1, the last reference value, optionally the filtered brake-application energy reference value Kappa of the vehicle deceleration control, is stored as:

Kappa-alt=Kappa

In step N2, a wheel brake ratio RBV is ascertained as a quotient of a Q factor Q-VA of the front axle VA and a Q factor Q-HA of the rear axle HA. These Q factors are already known per se and represent the applied brake force on the wheel or the axle as force per pressure, i.e., in the unit KN/bar. The Q factors Q-VA and Q-HA of the front axle VA and rear axle HA can be calculated in a known manner, for example, from Applicant's DE 102 61 513 A1.

In step N3, an axle load distribution ALD is ascertained as a product of the wheel brake ratio and the static pressure ratio K-stat ascertained in step J3. This axle load distribution ALD can also be ascertained from signals of axle load sensors of the tractor vehicle 2, if such axle load sensors are provided. It is also sufficient if tractor vehicle axle load sensors are only arranged on the rear axle HA, since the axle load distribution ALD can also be ascertained from the signals thereof—typically, in a tractor vehicle 2, in particular of a semitrailer tractor, the front axle load AL-ZVA and rear axle load AL-ZHA are in a fixed ratio to one another.

In steps N4 and N5, the brake pressure levels (brake-application energy levels) BDN-Z and BDN-A of the tractor vehicle 2 and of the trailer vehicle 3 are ascertained from the data for the axle load distribution ALD and the brake-application energy reference value Kappa on the basis of the characteristic maps shown in FIGS. 2a and 2b, which are provided for an influencing factor of 100%, In the characteristic maps of FIGS. 2a and 2b, in the parallelograms, the slopes of the ALD-dependent straight lines to ascertain the brake-application energy levels BDN-Z and BDN-A are dependent on the value of the influencing factor E; with changing influencing factor E, the slopes of the ALD-dependent straight lines change and therefore the values, which are ascertained by means of the characteristic maps, of the brake-application energy levels BDN-Z and BDN-A also change. In a non-braked phase, the brake pressure setpoint values (brake-application energy setpoint values) P-Soll-Z and P-Soll-A are set to zero according to step N6. Step S1 (start) is then revisited.

Therefore, brake pressure setpoint values (brake-application energy setpoint values) P-Soll-Z for the tractor vehicle 2 and P-Soll-A for the trailer vehicle 3 are already ascertained from this method—which is known per se—according to FIG. 1. Furthermore, the axle load distribution ALD is ascertained, as also already described in DE 102 61 513 A1.

Furthermore, an influencing factor E, which is also designated as a CFC factor, is known; this influencing factor E is apparent from FIGS. 2a to 2j, which are already fundamentally described in DE 102 61 513 A1, and which show characteristic maps having different influencing factors, and are also described in DE 102 61 513 A1 with reference to these characteristic maps; the influencing factor E can be between a maximum value of 100%, at which the brake-application energy level (brake pressure level) of the tractor vehicle BDN-Z is only dependent on the axle load distribution ALD, i.e., the characteristics according to FIG. 2a for the various axle load distributions ALD run parallel to the X axis and the brake pressure level BDN-A of the trailer vehicle 3 is dependent on the axle load distribution ALD and on the brake-application energy reference value Kappa, and a minimum value of 0% for E, at which the brake pressure levels BDN-Z of the tractor vehicle 2 and BDN-A of the trailer vehicle 3 are only dependent on the brake-application energy reference value (brake pressure level reference value) Kappa, as shown in FIGS. 2i and 2j.

The loading states of the two partial vehicles 2, 3 of the vehicle combination 1 can now be read off from the brake pressure level BDN-Z of the tractor vehicle 2 and the brake pressure level BDN-A of the trailer vehicle 3:

$BDN\text{-}Z=4.7 \text{ bar/g} \rightarrow$ tractor vehicle 2 empty, $BDN\text{-}Z=8.5 \text{ bar/g} \rightarrow$ tractor vehicle 2 fully loaded, $BDN\text{-}A=1.9 \text{ bar/g} \rightarrow$ trailer vehicle 3 empty, $BDN\text{-}A=8.5 \text{ bar/g} \rightarrow$ trailer vehicle 3 fully loaded.

Linear interpolation is respectively performed between these values for BDN-Z, i.e., between 4.7 and 8.5 bar/g and for BDN-A between 1.9 and 8.5 bar/g.

From these load states, i.e., the current weight M-ZFZ of the tractor vehicle 2 and the current weight M-AFZ of the frailer vehicle 3, which respectively correspond to the sum of their axle loads, while using the axle load distribution ALD, several variables can now be ascertained if the geometric dimensions of the vehicle combination 1 are known:

The absolute axle loads of each axle, i.e., each axle of the tractor vehicle 2 and of the trailer vehicle 3, can be ascertained, since, for example, for the tractor vehicle 2, the weight is known as the sum of the axle loads:

$$M\text{-}ZFZ=AL\text{-}ZVA+AL\text{-}ZHA$$

furthermore the axle load distribution:

$$ALD=AL\text{-}ZVA\text{:}AL\text{-}ZHA$$

is known, so that a system of equations having two equations and two unknown variables is formed, which can be solved (in the rule of three). These absolute axle loads can subsequently be used in the vehicle dynamics control method.

Furthermore, the center of gravity location of each vehicle 2, 3 can be ascertained, for the tractor vehicle 2, for example, from the lever rule, according to which levers are applied from the (unknown) center of gravity to the axles and the product of lever length and axle load is equal for both axles. The ratio of the lever lengths is therefore the reciprocal value of the axle load distribution ALD. In the case of axle loads on the tractor vehicle 2 at front axle and rear axle of, for example, AL-ZVA=6.0 t and AL-ZHA=4.0, the ratio of the lever lengths is:

$$h\text{-}ZVA/h\text{-}ZHA=4/6$$

wherein the sum of the lever lengths h-ZVA+h-ZHA is known as the axle distance (wheelbase) of the tractor vehicle 2, so that the lever lengths h-ZVA and h-ZHA can be ascertained.

Therefore, the center of gravity location of the vehicle combination 1 can also be ascertained if the longitudinal dimensioning of the trailer vehicle, i.e., the distance of the trailer vehicle axles AA-1 and AA-2 from the tractor vehicle rear axle ZHA, is known.

Figure 4:
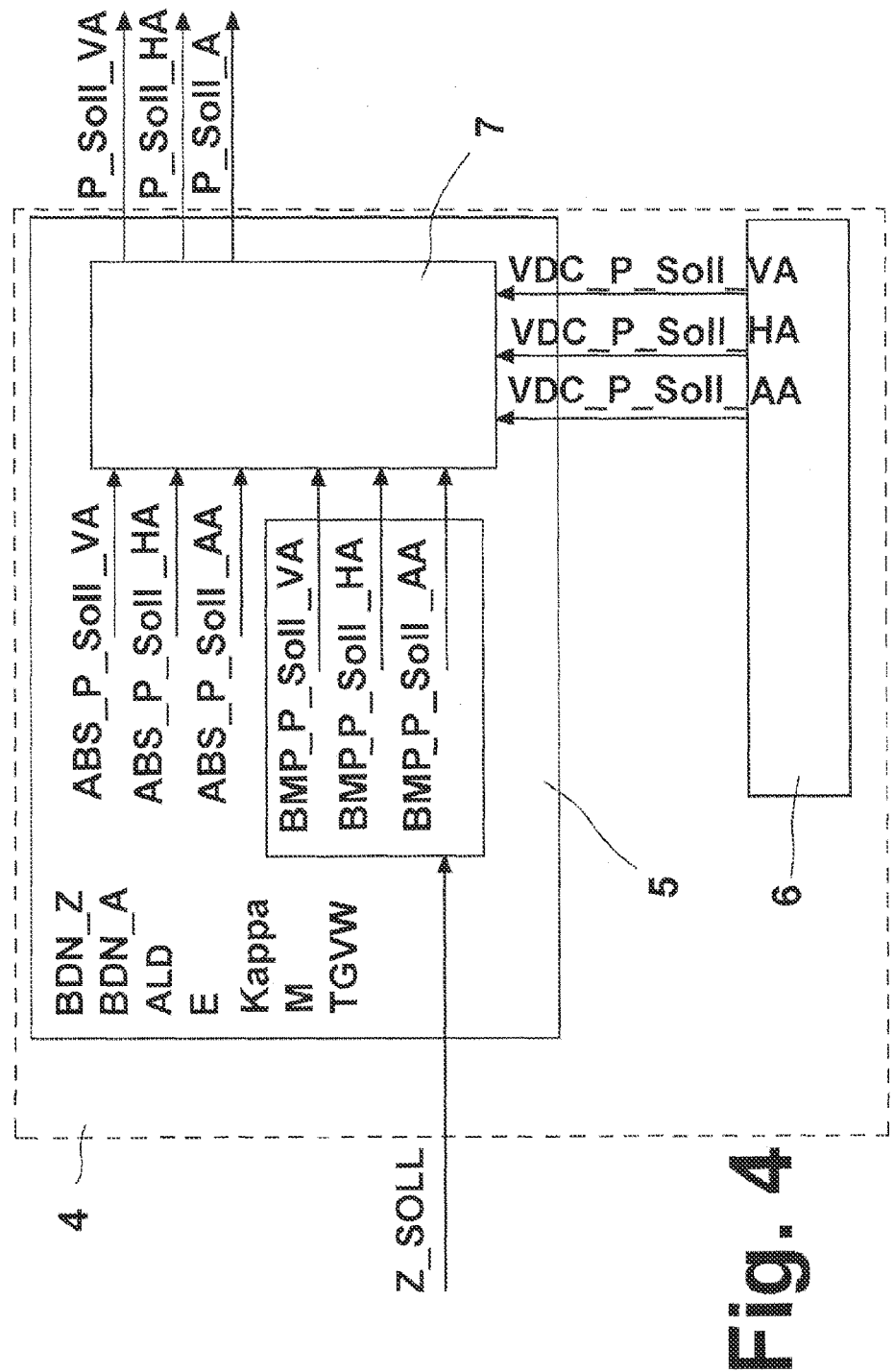
FIG. 4 shows a brake control unit having BBS control unit and VDC control unit according to an embodiment of the present invention.

FIG. 4 shows the basic construction of a brake control unit 4, which has an EBS control unit (electronic brake system) 5 and a VDC control unit (vehicle dynamics control system) 6. In this case and in the other embodiments, the EBS control unit 5 and the VDC control unit 6 can be implemented as separate units or control devices and communicate with one another, or car) also be implemented solely as software in a control unit.

In FIGS. 4 to 8, in this case, M is the total weight of the vehicle combination 1, which is previously known or is preferably ascertained in driving operation, ALD is the axle load distribution, and TGVW is the permissible weight of the tractor vehicle 2 (total gross vehicle weight).

From input variables, for example the total weight M, a yaw rate GR, a steering angle LW, a longitudinal acceleration ax, and a lateral acceleration ay, also supplemented with further vehicle dynamics variables, for example, the vehicle velocity v, the VDC control unit 6 calculates pressure setpoint values P-Soil for the various axles, i.e., VDC-P-Soll-VA as a pressure setpoint value for the front axle VA of the tractor vehicle 2, VDC-P-Soll-HA for the rear axle HA of the tractor vehicle 2 and VDC-P-Soll-AA for the trailer vehicle 3, and outputs these variables to the EBS control unit 5, in particular a calculation unit 7 for setpoint pressures of the EBS control unit 5.

However, in a vehicle combination in which the trailer vehicle 3 does not have a separate axle load-dependent brake force control (ALB function), such a system is not optimal. The total weight M ascertained by the EBS control unit 5 and used by the VDC control unit 6 represents a very general value, which does not make a statement about the precise loading states of the partial vehicles 2, 3. However, in trailer vehicles 3 without a separate ALB function, it is very helpful to know and consider how many axles the trailer vehicle 3 has and where the centers of gravity lie. This is illustrated with reference to FIG. 10, in which three vehicle combinations 1 are shown. The trailer vehicle 3 according to the top illustration has one trailer axle AA1; the trailer vehicle according to the middle illustration has two trailer axles AA1 and AA2; and the trailer vehicle according to the bottom illustration has three trailer axles AA1, AA2, and AA3. The total weight M of 28 t is therefore distributed very differently—according to the top illustration, the vehicle combination is fully loaded; according to the middle illustration it is half-loaded; and according to the bottom illustration it is less than half-loaded.

In FIG. 10, the following are applied:
total weight M of the vehicle combination=28 t
ALD=0.65; this is ascertained according to the above method.
Kappa=8.5 bar/g (the middle value at the bottom)
BDN-Z=8.5 bar/g (the left-hand value at the bottom)
BDN-A=8.5 bar/g (the right-hand value at the bottom)

Figure 5:
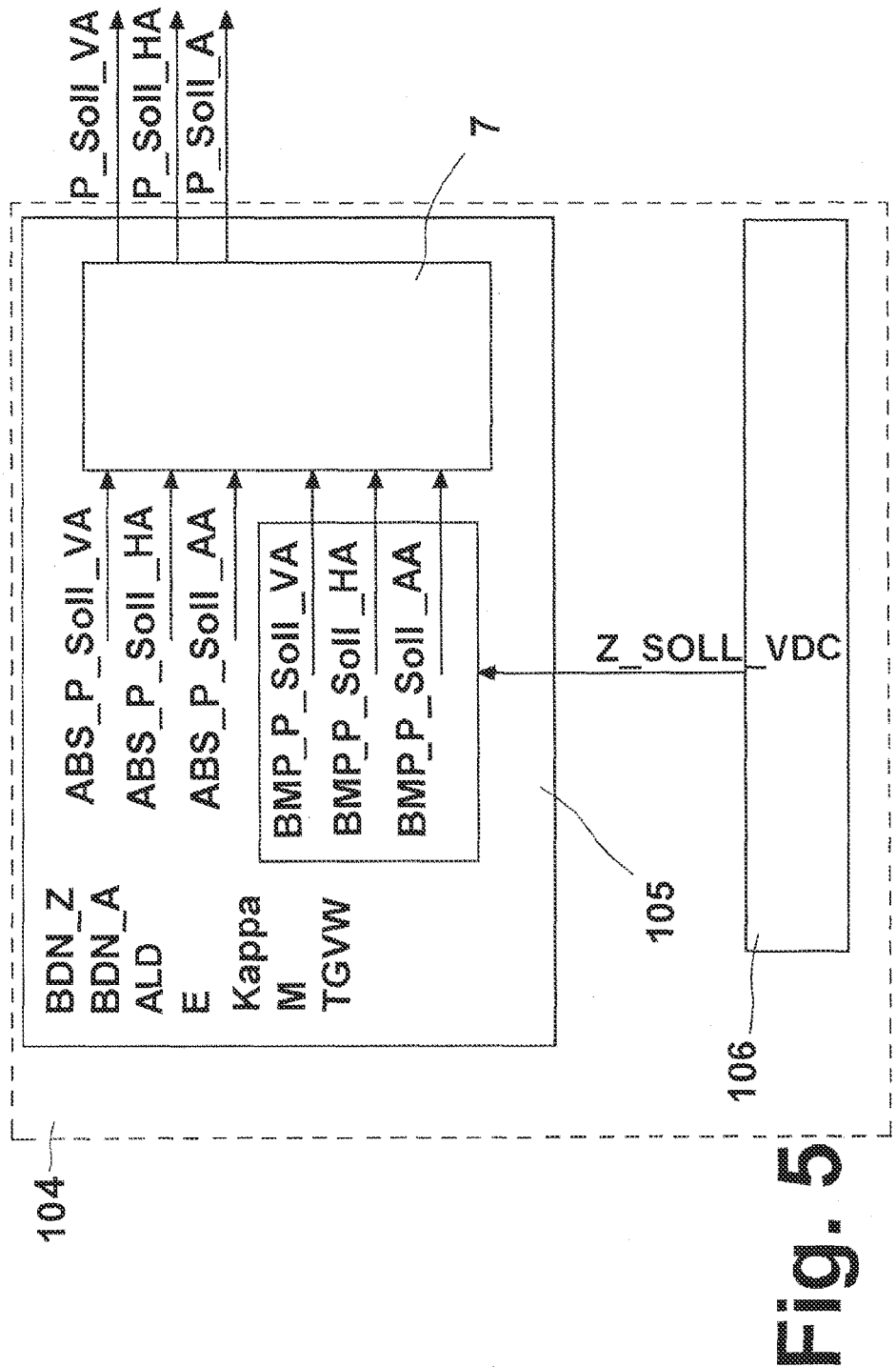
FIG. 5 shows a brake control unit according to a further embodiment having a VDC optimization step for a vehicle combination having a trailer vehicle without a separate ALB function.

FIG. 5 shows a brake control unit 104, in which pressure setpoint values are no longer calculated and ascertained by the VDC control unit 106, but, rather, the EBS control unit 105 is transferred a vehicle deceleration setpoint value Z-Soll-VDC. The EBS control unit 105 then incorporates the foregoing variables and, therefore, ensures better adaptation of the setpoint pressures P-Soll-VA, P-Soll-HA, P-Soll-A, which are now output by the EBS control unit 105, to the current load states. The foregoing variables are directly incorporated in these VDC systems by the closed control loops.

Figure 6:
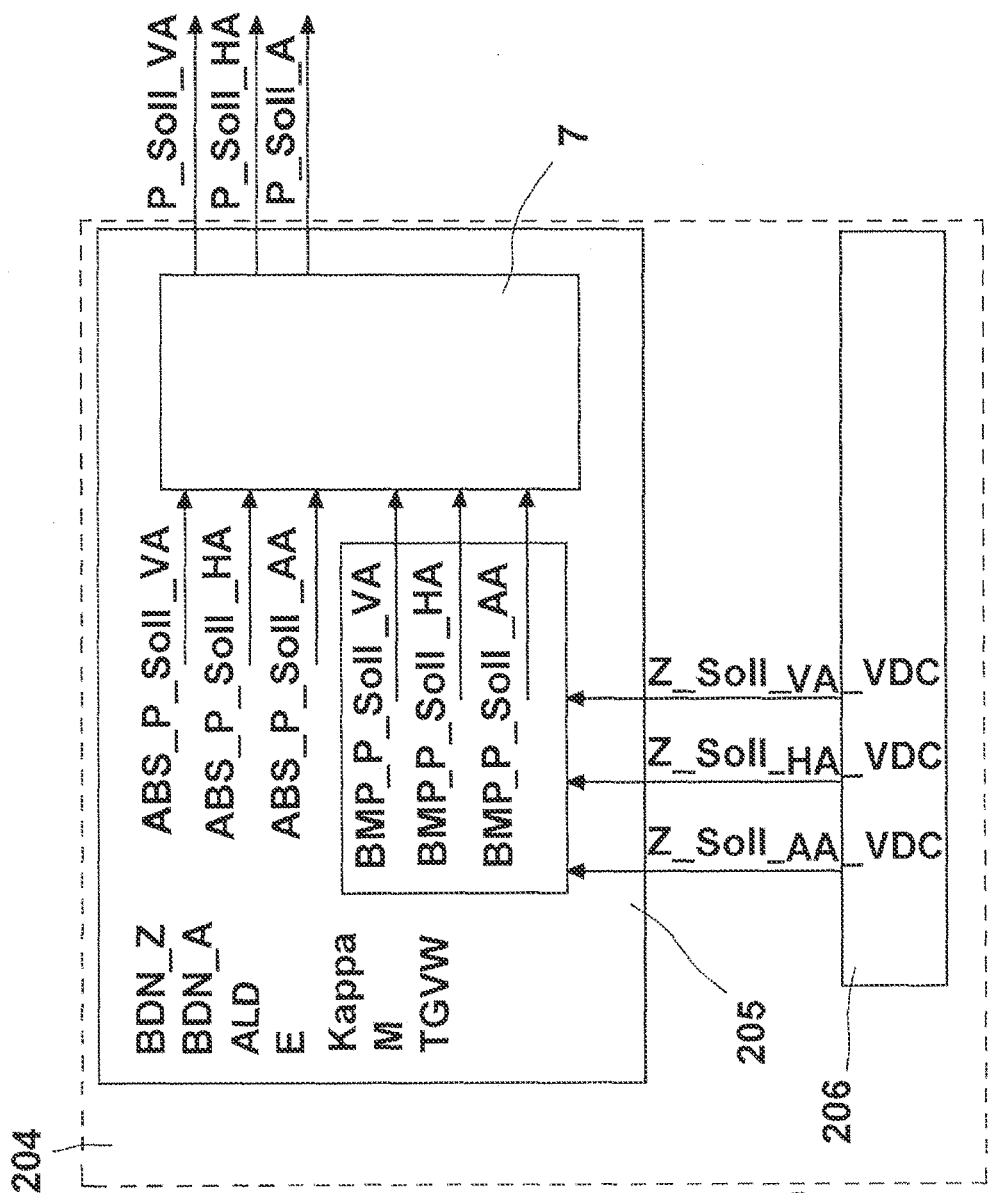
FIG. 6 shows a construction step of the brake control unit according to FIG. 5.

FIG. 6 shows a refinement of the control unit depicted in FIG. 5, having a brake control unit 204, EBS control unit 205, and VDC control unit 206. Here, it is no longer the case that only a single deceleration setpoint value (for the vehicle combination 1) is transferred from the VDC control unit 206 to the EBS control unit 205, but, rather, axle-related deceleration setpoint values Z-Soll-VA-VDC, Z-Soll-HA-VDC, Z-Soll-A-VDC are now ascertained and transferred.

Figure 7:
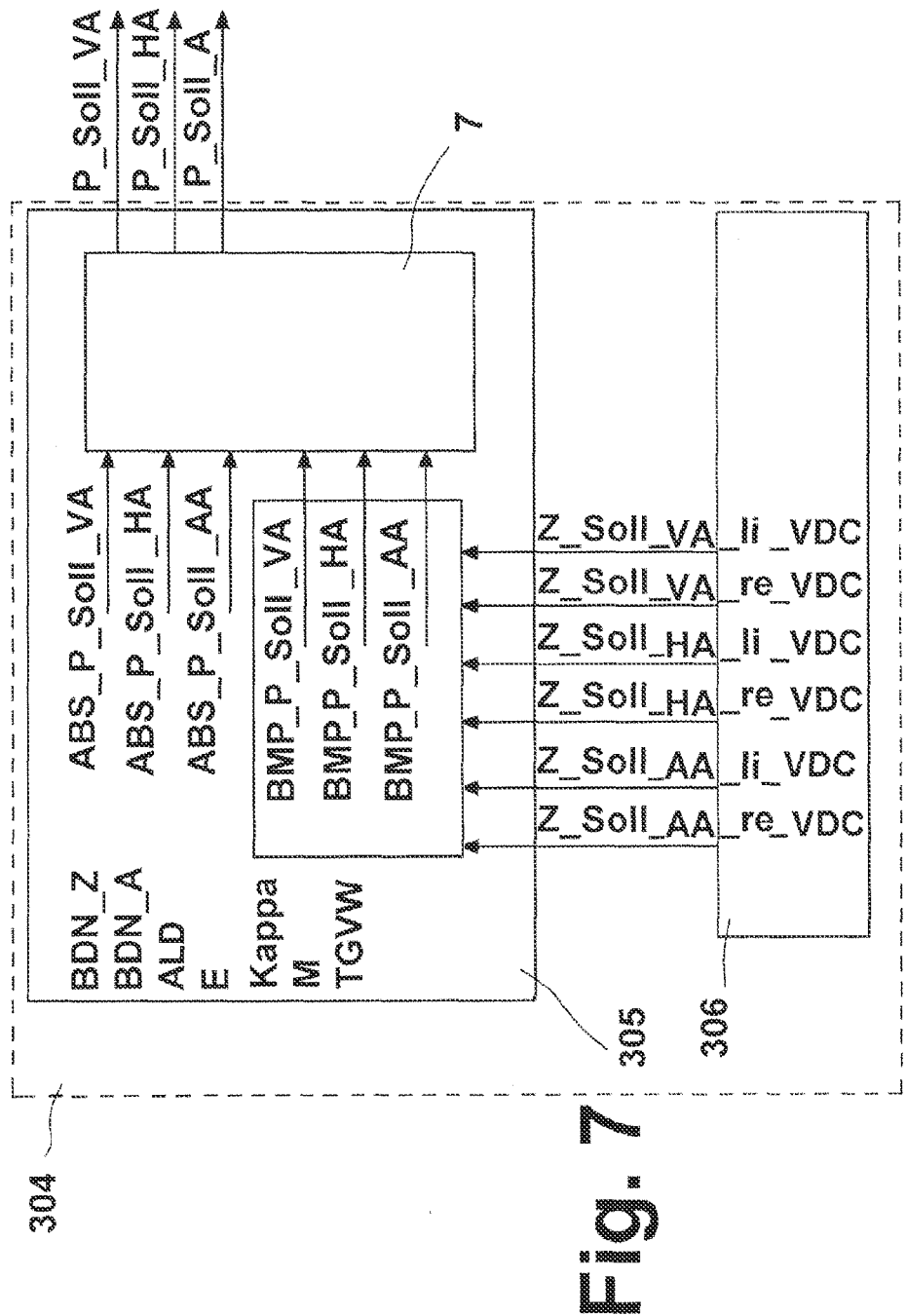
FIG. 7 shows an alternative construction step of the brake control unit according to FIG. 5.

FIG. 7 shows a further construction step, having a brake control unit 304, EBS control unit 305, and VDC control unit 306, In this case, the transfer of the deceleration setpoint value from the VDC control unit 206 to the EBS control unit 205 occurs wheel-by-wheel, i.e., for each axle and for the right and left wheel on each axle.

Figure 8:
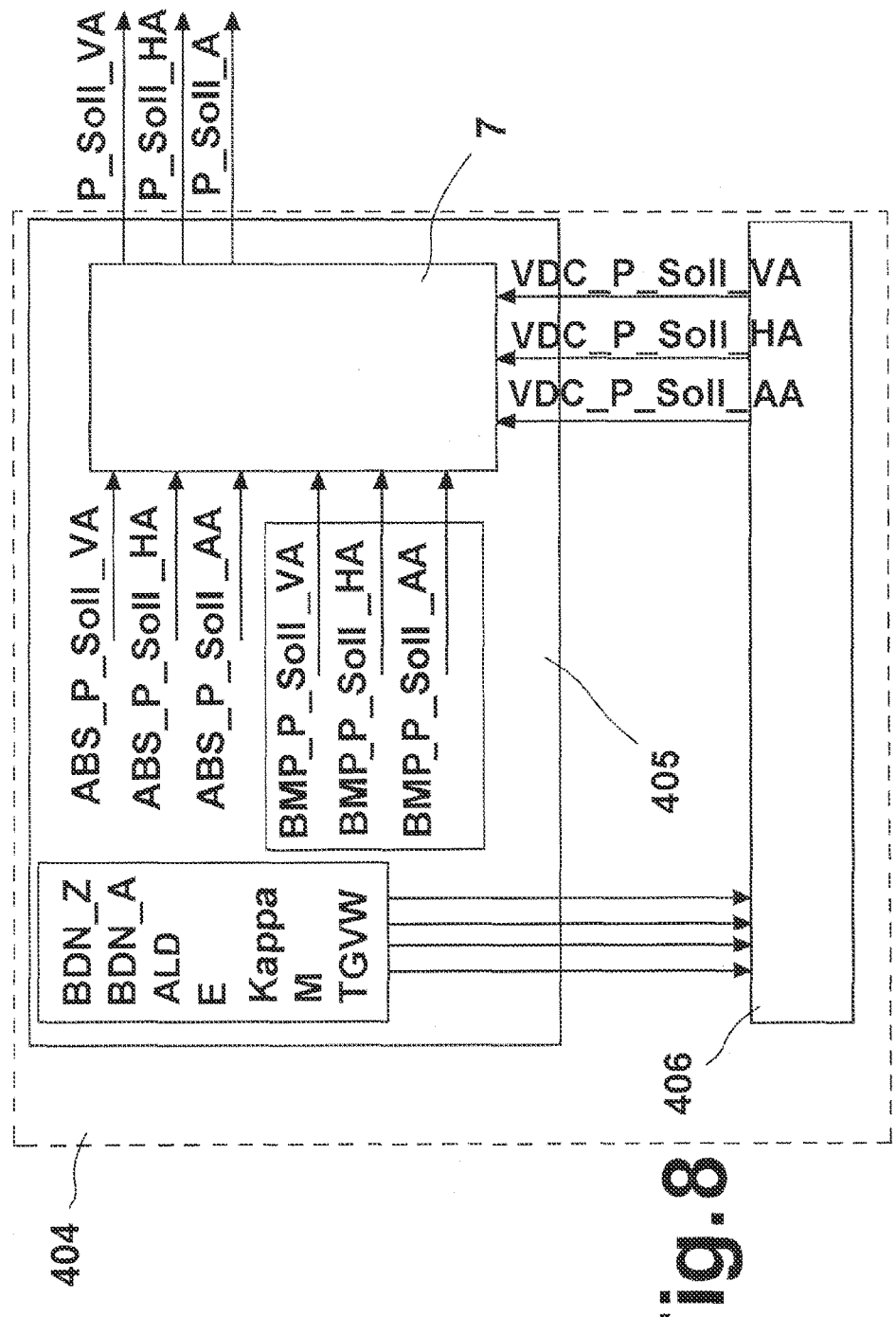
FIG. 8 shows a brake control unit according to a further embodiment of the present invention, which independently records and analyzes corresponding signals.

FIG. 8 shows a brake control unit 404 having EBS control unit 405 and VDC control unit 406, wherein the VDC control unit 406 inputs the input variables Kappa, BDN-Z, BDN-A, ALD, and E from the EBS control unit 405 and analyzes them itself, in order to itself be able to predefine the brake pressure setpoint values P-Soll-Z and P-Soll-A adapted to the loading states, depending on the implementation of the individual vehicles 2, 3 or the vehicle combination 1, in this case, also respectively axle by axle or wheel-by-wheel.

Two exemplary calculations of the weights M-ZFZ, M-AFZ of the partial vehicles 2, 3 of a vehicle combination 1 and the determination of the loading states thereof are now shown hereinafter, wherein this exemplary calculation can be transferred to the other embodiments:

I. Calculation Example 1

It is assumed that a loading situation of the vehicle combination 1 is provided as in FIG. 3(d), i.e., corresponding to FIG. 5(c) of DE 102 61 513 A.1, and that an influencing factor E of 100% and a permissible weight TGVW of 18 t are provided, corresponding to FIG. 5(c) of DE 102 61 513. In this case, it is also assumed that an axle load distribution ALD of 1.5, a current brake-application energy reference value Kappa of 6.6 bar/g, and a total weight M of 28 t have been acquired: furthermore, it is assumed that the brake-application energy level BDN-Z for the tractor vehicle 2 of 4.7 bar/g and the brake-application energy level BDN-A for the trailer vehicle 3 of 8.5 bar/g have been ascertained, which are calculated by the BBS control unit 5, 105, 205, 305, 405.

Figure 3:
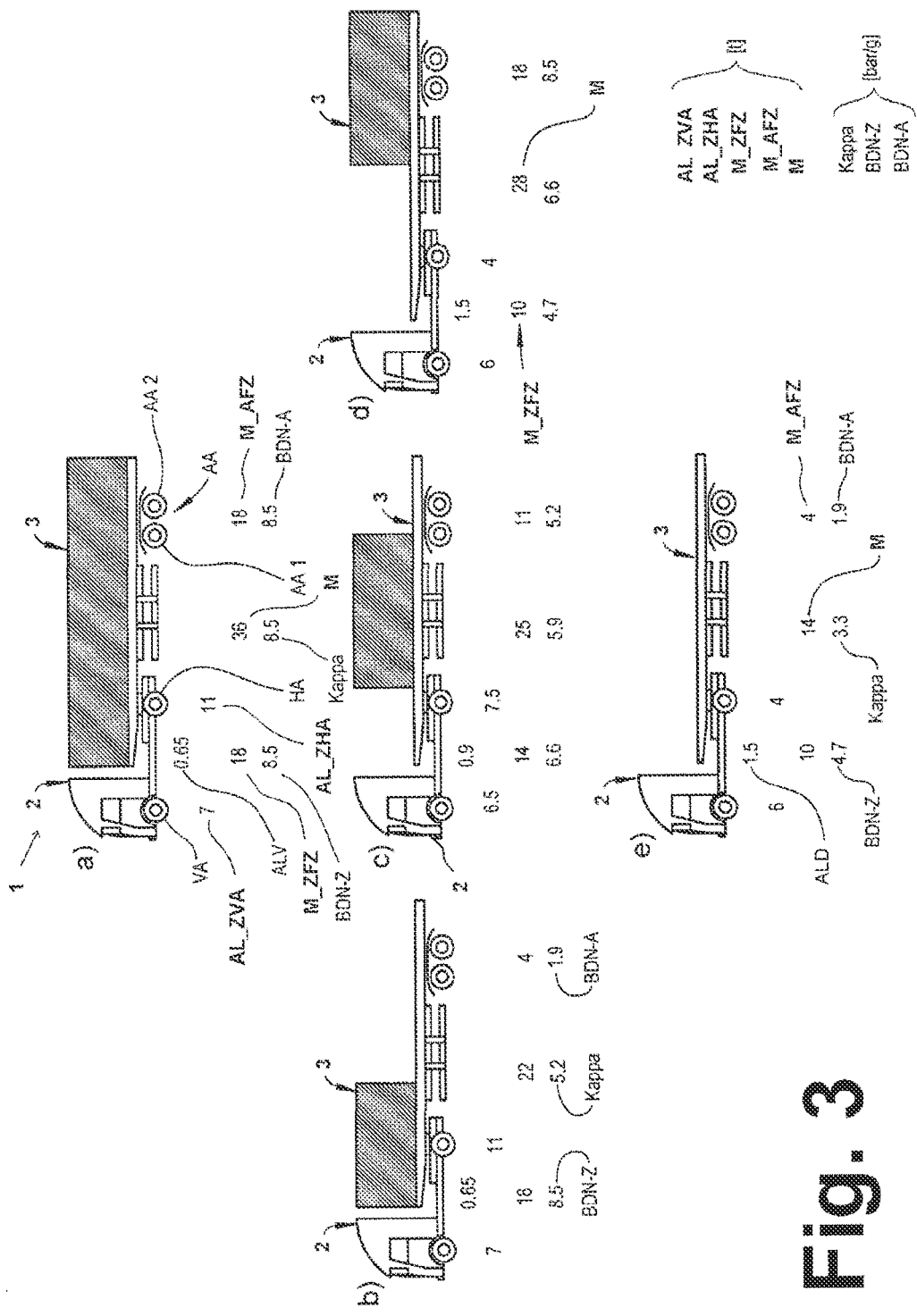
FIG. 3 shows a vehicle combination having a tractor vehicle and a trailer vehicle having two axles in different loading states with specification of relevant variables.
Figure 11:
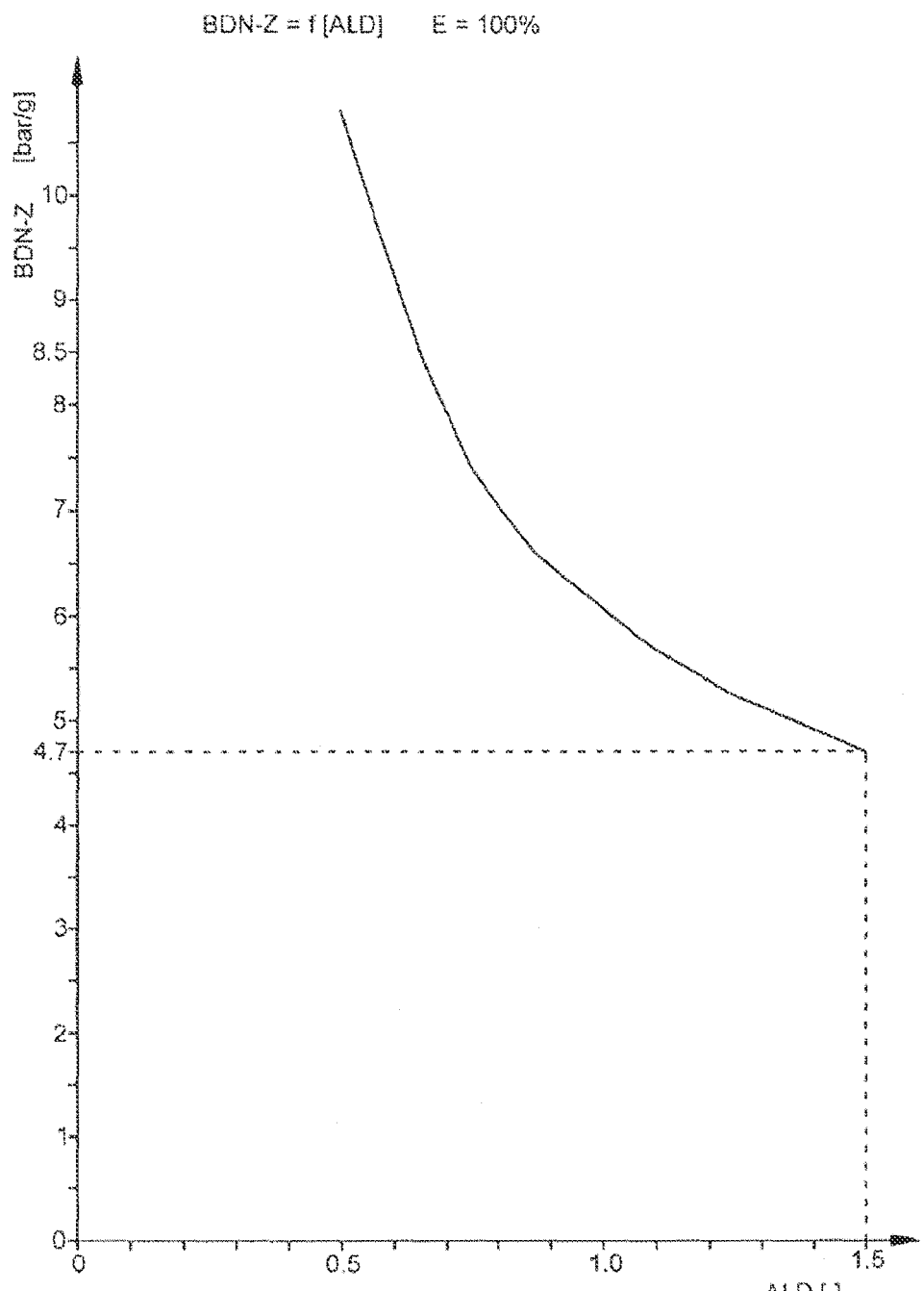
FIG. 11 is a reproduction of FIG. 8 from Applicant's DE 102 61 513 A1, which is a graphical representation of the relationship between the brake-application energy level BDN-Z of the tractor vehicle and the axle-load ratio ALD.

In FIG. 3, the influencing factor E is set to 100%.
Calculation of the Weight M-ZFZ and the Axle Loads AL-ZVA, AL-ZHA of the Tractor Vehicle 2:

Since, in this calculation example, the influencing factor is set to 100%, there is a direct relationship between the brake-application energy level BDN-Z and the axle load distribution ALD, corresponding to the illustration in FIG. 11, i.e., the characteristic BDN-Z=f(ALD) shown in FIG. 11 is directly decisive for the calculation of the axle loads AL-ZVA, AL-ZHA of the tractor vehicle 2.

The axle loads of the tractor vehicle are therefore calculated as:

axle load of the front axle $AL\text{-}ZVA = TGVW*BDN\text{-}Z/8.5\ bar/g*ALD/(ALD+1)$ axle load of the rear axle $AL\text{-}ZHA = TGVW*BDN\text{-}Z/8.5\ bar/g*1/(ALD+1)$ and, therefore:

$AL\text{-}ZVA = 6.0\ t$ and $AL\text{-}ZHA = 4.0\ t$

The weight M-ZFZ of the tractor vehicle 2 is calculated proportionally from the ascertained brake-application energy level BDN-Z of the tractor vehicle 2, since the influencing factor E is equal to 100%, as:

$TGVW*BDN\text{-}Z/8.5\ Bar/g$ and therefore:

$M\text{-}ZFZ = 10.0\ t$

Calculation of the Weight M-AFZ and the Axle Loads of the Trailer Vehicle 3:

The weight M-AFZ of the trailer vehicle 3 is calculated from the difference of the ascertained total weight M and the calculated weight M-AFZ of the tractor vehicle 2:

$M\text{-}AFZ = M - M\text{-}ZFZ$ and therefore as:

$M\text{-}AFZ = 28.0\ t - 10.01 = 18.0\ t$

The load state of the trailer vehicle 3 is ascertained by the control unit of the EBS control unit (5, 105, 205, 305, 405) from the brake-application energy level BDN-A of the trailer vehicle 3 and the set influencing factor E. Since, in this calculation example 1, the set influencing factor E is 100% and therefore the ascertained brake-application energy levels BDN-Z, BDN-A (also called brake pressure levels) of the partial vehicles 2, 3 may be assigned directly to the weights M-AFZ, M-ZFZ of the partial vehicles 2, 3, i.e., there is an approximate proportionality between the ascertained brake pressure level of each partial vehicle 2, 3 and its weight M-ZFZ, M-AFZ, and the ascertained brake-application energy level BDN-A of the trailer vehicle is 8.5 bar/g, the method determines that the axles AA1, AA2 of the trailer vehicle 3 have an axle load AL-AA1, AL-AA2, which correspond precisely to the fully loaded state of the trailer vehicle 3. In this calculation example 1, a weight M-AFZ of the trailer vehicle 3 of 18 t and a brake-application energy level BDN-A of 8.5 bar/g were calculated. In this case, the method further assumes that a two-axle trailer vehicle (semitrailer) 3 is provided, whose axle load AL-AA1, AL-AA2 per axle AA1, AA2 is respectively 9.0 t.

The axle configuration, i.e., the number of the axles of the trailer vehicle 3, is advantageously input via a data interface (CAN bus).

The brake-application energy level BDN-A, ascertained in this case as 8.5 bar/g, is of predominant significance in determining the axle loads AL-AA1, AL-AA2 of the axles AA1, AA2 of the trailer vehicle 31; the precise full loading state is therefore known.

The following is therefore ascertained:
a) the trailer vehicle 3 is fully loaded
b) there is a two-axle trailer vehicle 3 having an axle load AL-AA1, AL-AA2 (AA1, AA2) of respectively 9.0 t.

In the calculations of, for example, setpoint pressures (VDC-P-Soll-VA, VDC-P-Soll-HA, VDC-P-Soll-AA) for individual vehicle axles or of, for example, setpoint pressures (VDC-P-Soll-VA-li, . . . ) for individual wheels of the two partial vehicles 2, 3, i.e., tractor vehicle 2 and trailer vehicle 3 of a vehicle combination 1 by a VDC system, the VDC control unit can now use, as a foundation, the fact that the vehicle combination is fully loaded in spite of an ascertained relatively low total weight M of the vehicle combination 1 of 28 t on the axles AA1, AA2 of the trailer vehicle 3, and the load on the axles VA, HA of the trailer vehicle 2 is comparatively small, a safe brake pressure control on all axles and wheels, which is adapted to the loading state of the vehicle combination 1, is therefore possible, whereby critical driving states are substantially avoidable. In this calculation example 1, it is recognized that the loading situation of the vehicle combination 1 is of a very rear-loaded type. In the calculation of the setpoint pressures VDC-P-Soll-VA, VDC-P-Soll-HA, VDC-P-Soll-AA of the individual axles VA, HA, AA1, AA2 and wheels by the VDC control unit, the influence of the ascertained brake-application energy level BDN-A is advantageously given greater worth than the calculated weight M-AFZ of the trailer vehicle 3.

II. Calculation Example 2

It is now assumed that the loading situation of the vehicle combination 1 is the same as shown in FIG. 5c) of DE 102 61 513 A1, but contrary to the calculation example 1, an influencing factor E of 0% is now set, i.e., in this calculation example 2, FIG. 5i) of DE 102 61 513 A1 is decisive.

The following apply, as in calculation example 1:

Set (wherein the term "set" typically stands for "parameterized" in the vehicle) permissible weight TGVW=18 t and acquired axle load distribution ALD=1.5. The current brake-application energy reference value Kappa is also to be 6.6 bar/g as in FIG. 5c), the total weight M is also to be learned as 28.0 t. Notwithstanding FIG. 5c), however, the brake-application energy level BDN-Z of the tractor vehicle 2 is to now be 7.1 bar/g and the brake-application energy level BDN-A of the trailer vehicle 3 is to be 6.1 bar/g, as shown in FIG. 5(i) of DE 102 61 513 A1.

Calculation of the Weight M-ZFZ of the Tractor Vehicle 2:

Since, in the present calculation example 2, the influencing factor E is set at 0%, the direct relationship between the current brake-application energy level BDN-Z, ascertained in the calculation example as 7.1 bar/g, and the axle load distribution ALD corresponding to the function BDN-Z=f(ALD) of FIG. 11 no longer applies, however, the axle load distribution ALD of the tractor vehicle 2 is known to be 1.5.

The method has characteristic maps BDN-Z=f(ALD, Kappa, B) stored for any possible set influencing factor E, for example, like that shown in FIG. 2a, thus, also for an influencing factor E of 100%. The characteristic map of FIG. 2a is the characteristic map to ascertain the brake-application energy level BDN-Z at a set influencing factor E of 100%. A set influencing factor E of 100% expresses that no intentional shifting of braking work to be applied is to be performed in a manner that is brake force neutral in sum between the partial vehicles 2, 3; each partial vehicle 2, 3 of the vehicle combination 1 is to brake itself. The characteristic map of FIG. 2a shows that the BDN-Z of the tractor vehicle 2 at an ascertained axle load distribution ALD of 1.5 and a set E of 100% would be 4.7 bar/g. That is, at a set influencing factor E of 100%, a brake-application energy level BDN-Z of 4.7 bar/g for the tractor vehicle 2 would be necessary to be able to brake the weight M-ZFZ of the tractor vehicle 2 by the brakes of the tractor vehicle 2 alone.

The weight M-ZFZ of the tractor vehicle 2 may now be calculated:

$$M\text{-}ZFZ = TGVW * BDN\text{-}Z/8.5 \text{ bar/g} = 18 \text{ t} * 4.7 \text{ bar/g}/8.5 \text{ bar/g} = 10.0 \text{ t}$$

wherein the brake-application energy level BDN-Z entered in the calculation is that of the influencing factor E=100%.

The result is:

$$M\text{-}ZFZ = 10.0 \text{ t}$$

The axle loads AL-ZVA, AL-ZHA of the tractor vehicle 2 are therefore calculated as:

axle load of the front axle $AL\text{-}ZVA = TGVW * BDN\text{-}Z/8.5 \text{ bar/g} * ALD/(ALD+1)$ axle load of the rear axle $AL\text{-}ZHA = TGVW * BDN\text{-}Z/8.5 \text{ bar/g} * 1/(ALD+1)$ and therefore:

$$AL\text{-}ZVA = 6.0 \text{ t and } AL\text{-}ZHA = 4.0 \text{ t}$$

wherein the brake-application energy level BDN-Z is also incorporated here at an axle load distribution ALD of 1.5 and an influencing factor E of 100%.

Calculation of the Weight M-AFZ of the Trailer Vehicle 2:

The weight M-AFZ of the trailer vehicle 2 is calculated from:

$$M\text{-}AFZ = M - M\text{-}ZFZ = 28 \text{ t} - 10 \text{ t} = 18 \text{ t}$$

The result is:

$$M\text{-}AFZ = 18.0 \text{ t}$$

Calculation of the Axle Loads AL-AA1, AL-AA2 and the Loading State of the Trailer Vehicle 3:

Calculation of the Loading State:

Although in this calculation example the ascertained weight M-AFZ of the trailer vehicle 3 at 18 t and the ascertained brake-application energy level BDN-A of the trailer vehicle 3 at 6.1 bar/g at first glance rather indicate a trailer vehicle 3 that is not fully loaded, the method unambiguously permits the actual and therefore higher loading state of the trailer vehicle 3 to be ascertained. For this purpose, as in the case of determining the axle loads AL-ZHA, AL-ZVA of the tractor vehicle 2, stored characteristic maps are used to ascertain brake-application energy levels BDN-A, BDN-Z of the partial vehicles 2, 3.

The value of the axle load distribution ALD of the tractor vehicle 2, the brake-application energy reference value Kappa and the current brake-application energy reference value BDN-Z t are known, which value in this method of a brake pressure control is responsible for the vehicle combination 1 consisting of tractor vehicle 2 and trailer vehicle 3, i.e., is the decisive reference factor for both partial vehicles 2, 3.

From these two variables, the axle load distribution ALD and the brake-application energy reference value Kappa, the current loading state of the trailer vehicle 3 may now be ascertained from the stored characteristic map BDN-A=f (Kappa, ALD, E) for ascertaining the brake-application energy level BDN-A of the trailer vehicle 3 for an influencing factor if of 100%, see FIG. 2b). At an axle load distribution ALD of 1.5 and a brake-application energy reference value Kappa of 6.6 bar/g, a brake-application energy level of the trailer vehicle 3 is ascertained to be BDN-A of 8.5 bar/g. That is, a brake-application energy level BDN-A of 8.5 bar/g would be required to brake the trailer vehicle 3 solely by its own brakes, i.e., without shifting of braking work to be applied between the partial vehicles 2, 3 of the vehicle combination 1, as is intended in the case of setting E to 0%. The result of the calculation therefore indicates that the trailer axles AA1, AA2 are precisely fully loaded, because a brake-application energy level BDN-A of 8.5 bar/g precisely corresponds to the defined value in bar/g for the precisely full loading state.

Calculation of the Axle Loads AL-AA1, AL-AA2 of the Trailer Vehicle 3:

A weight M-AFZ of the trailer vehicle 2 of 18 t has been calculated, from the equation M-AFZ=M−M-ZFZ. Furthermore, it is now known that the trailer vehicle 3 would require a brake-application energy level BDN-A of 8.5 bar/g if it had to brake itself alone. From the combination of these two values, it is now concluded that the trailer vehicle 3 is a two-axle trailer vehicle 3, the axles AA2, AA2 of which have an axle load of 9 t.

Calculation:

$$AL\text{-}AA1 = AL\text{-}AA2 = \tfrac{1}{2} * M\text{-}AFZ = \tfrac{1}{2} * 18\ t = 9\ t$$

A VDC system can therefore now calculate, for example, an axle load-dependent setpoint pressure VDC-P-Soll-AA for a trailer vehicle axle AA1, AA2, AA3, which considers an axle load of 9 t and/or the precisely fully loaded state of the trailer vehicle axle or of the trailer vehicle.

In the calculation example, based on the illustration of the vehicle combination in FIG. 5(i) of DE 102 61 513 A1, all axle loads AL-ZVA, AL-ZHA, AL-AA1, AL-AA2 and weights M-ZFZ, M-AFZ of the partial vehicles 2, 3 are now determined, in particular the loading states of the two partial vehicles 2, 3 of the vehicle combination 1 and of the vehicle combination 1 itself are determined.

A determination of the horizontal center of gravity locations of the partial vehicles 2, 3 and of the vehicle combination 1 is now easily possible, at least approximately, wherein the axle distances, at least those of the trailer vehicle 3, would typically be estimated.

Based on the knowledge of the loading states, the weights M-ZFZ, M-AFZ, the axle loads AL-ZVA, AL-ZHA, AL-AA1, AL-AA2, and the horizontal center of gravity locations of the partial vehicles 2, 3 and the vehicle combination 1, adapted axle-related and/or wheel-related brake setpoint pressure determinations in relation to individual axles and/or wheels are possible, whereby improved VDC control is made possible. The rear-loaded nature of the loading embodiment is known, in critical driving situations, a rapid reaction adapted to this circumstance can accordingly be taken.

In FIGS. 2a and 2b, the brake-application energy reference value Kappa is plotted as a value of the abscissa and, respectively, as the middle value in the lowermost line in the vehicle illustrations, for example, in those of FIG. 3, In this method, the brake-application energy reference value Kappa describes the ratios of the weights M-ZFZ, M-AFZ of the vehicle combination 1 and therefore of the loading states of the vehicle combination 1. If the vehicle combination 1 is fully loaded, the numeric value of the brake-application energy reference value Kappa is 8.5 bar/g. A brake-application energy reference value Kappa of 8.5 bar/g for the full vehicle state applies for each partial vehicle 2, 3, independently of what the embodiment, construction, etc. is; this is achieved by an adapted variation of setting values of the EBS control unit of the tractor vehicle 2. The Kappa of the empty or unloaded vehicle state is therefore oriented according to the so-called load/empty ratio of the vehicle combination 1, i.e., according to the total weight of the empty or unloaded state relative to the total weight of the fully loaded state. In the vehicle illustrations of FIG. 3, for example, the total weight of 36 t corresponds to the fully loaded vehicle combination, which is composed of a weight of 18 t for the fully loaded tractor vehicle and a weight of 18 t for the fully loaded two-axle trailer vehicle, and to a Kappa of 8.5 bar/g, as can be inferred from FIG. 3 in the illustration of the vehicle combination at the top. The unloaded vehicle combination 1, shown in the lowermost line in FIG. 3, has a total weight of 14 t, a brake-application energy reference value Kappa of 3.3 bar/g (8.5 bar/g/36 t*14 t=3.3 bar/g) is thus calculated. All values in between can be interpolated depending on the weight.

FIG. 2b shows the brake-application energy level BDN-A (also called the brake pressure level) of the trailer vehicle 3 as a value of the ordinate of the characteristic map (also called the diagram) and describes in the characteristic map of FIG. 2b, that, for a set influencing factor E of 100%, the loading state of the trailer vehicle 3 therefore directly applies. If the trailer vehicle 3 is fully loaded, the numeric value is 8.5 bar/g. In the empty state, this value is 1.9 bar/g, corresponding to the load/empty ratio of the trailer vehicle axles AA1, AA2 of 18 t to 4 t. All values in between can be interpolated depending on weight. If the influencing factor E in the characteristic map for ascertaining the brake-application energy level BDN-A is less than 100%, the brake-application energy level BDN-A indirectly describes the loading state of the trailer vehicle 3; E is used for the purpose of shifting the braking work to be applied between the partial vehicles 2, 3 and also indirectly has the result that a direct weight-dependent proportionality no longer exists.

To be able to calculate axle loads AL-AA1, AL-AA2 of the trailer vehicle 3 from an ascertained BDN-A at a set influencing factor E of less than 100%, for example, the characteristic map is advantageously used to ascertain the brake-application energy level BDN-A that applies for a set influencing factor E of 100%, with incorporation of the brake-application energy reference value Kappa and the axle load distribution ALD of the tractor vehicle 2.

FIG. 2a shows the brake-application energy level BDN-Z as the ordinate value of the characteristic map, the abscissa value is the brake-application energy reference value Kappa. In this diagram having an influencing factor E of 100%, the brake-application energy level BDN-Z of the tractor vehicle 2 does not change if ALD does not change, at constant ALD, BDN-Z only changes if Kappa changes. This characteristic map follows the specification that each partial vehicle 2, 3 has to brake itself. There is no shift of braking work to be applied between the partial vehicles 2, 3 of a vehicle combination 1.

The different values of the brake pressure levels BDN-Z, BDN-A of the unloaded vehicle states of the partial vehicles 2, 3, i.e., 4.7 bar/g of the tractor vehicle 2 and 1.9 bar/g of the trailer vehicle 3, therefore show different load/empty ratios of the two partial vehicles 2, 3 to one another. An unloaded semitrailer as an example of a trailer vehicle 3 has on its axles AA1, AA2 in sum less axle load, i.e., a lower weight M-AFZ, than a semitrailer tractor 2 as an example of a tractor vehicle 2, with attached unloaded semitrailer 3.

Figure 9:
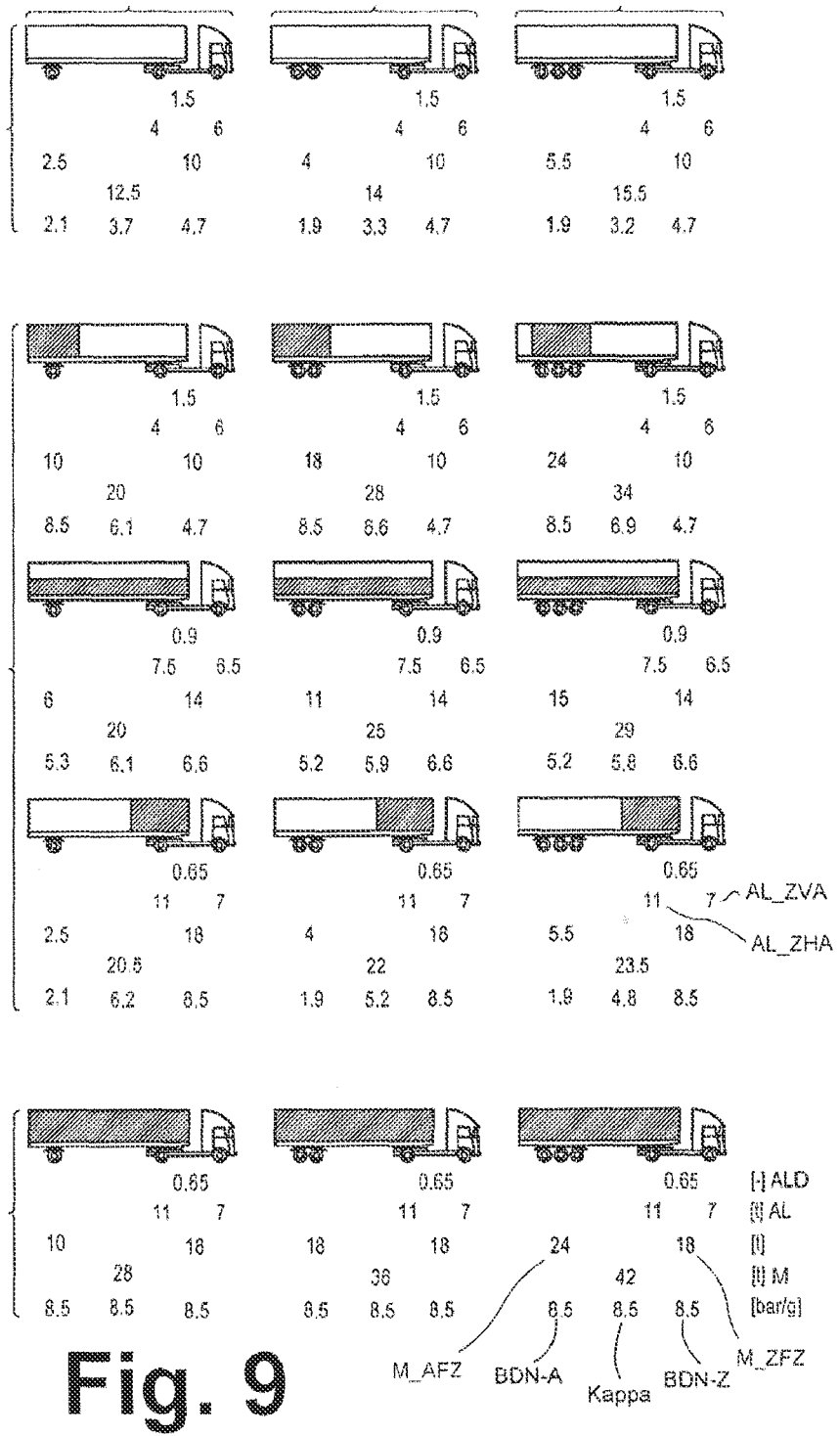
FIG. 9 shows various vehicle combinations having 1, 2, and 3 axles of the trailer vehicle in comparably different loading states.

FIG. 9 describes all loading states of vehicle combinations 1, which are formed, respectively, from a semitrailer tractor having two axles and four wheels as the tractor vehicle 2 and, respectively, one trailer vehicle 3, which, according to the different illustrations, has one trailer axle AA1, two trailer axles AA1 and AA2, or three trailer axles AA1, AA2, AA3 and is implemented as a trailer.

All states, including the extreme states, are recognized via the variables total weight M, brake-application energy reference value Kappa, influencing factor E, axle load distribution ALD, brake-application energy level BDN-Z of the tractor vehicle 2, and brake-application energy level BDN-A of the trailer vehicle 3, i.e., a vehicle dynamics control is now optimally informed about the loading state, and can take measures in critical situations much better and from the beginning, for example, controlling brake pressures which prevent tilting or skidding of the vehicle combination 1.

According to a further embodiment, it can be considered that, in practice, there are always interfering variables that make it more difficult to precisely determine the values of total weight M, brake-application energy reference value Kappa, axle load distribution ALD, brake-application energy level BDN-Z of the tractor vehicle 2, and brake-application energy level BDN-A of the trailer vehicle 3. It is thus conceivable, for vehicle dynamics purposes, to perform classifications, for example, a classification into:
  first class: full;
  second class: half-full;
  third class: empty.

Furthermore, it is conceivable to additionally perform a classification into:
  fourth class: front-loaded loading;
  fifth class: harmonic/middle loading;
  sixth class: rear-loaded loading.

The axle load distribution ALD can fundamentally be ascertained for any vehicle type, i.e., for semitrailer tractors, buses, utility vehicles, passenger automobiles, etc.

The method manages without axle load sensors; fundamentally, axle load sensors are not even necessary in the vehicle combination 1.

The trailer vehicle 3 or the semitrailer can be a conventionally braked semitrailer or also an EBS controlled semitrailer.

It will thus be seen that the objects set forth above, among those made apparent from the preceding description, are efficiently attained, and since certain changes may be made without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention that, as a matter of language, might be said to fall there-between.

What is claimed is:

1. A method for controlling the brakes of a vehicle combination having a tractor vehicle equipped with an electronically controlled brake system, at least one front axle and a rear axle, and a trailer vehicle having at least one trailer axle, the method comprising:
  when at least one of a brake pedal actuation occurs and a brake value encoder signal is output, determining, using at least one control unit associated with the tractor vehicle, a deceleration setpoint value, comparing the deceleration setpoint value to a deceleration actual value, and determining a brake-application energy reference value;
  determining, using the at least one control unit, brake-application energy setpoint values for the tractor vehicle and the trailer vehicle from the brake-application energy reference value and brake-application energy levels for the tractor vehicle and the trailer vehicle using stored characteristic maps, the characteristic maps being obtained as a function of at least one pre-definable influencing factor and illustrating dependencies of the brake-application energy levels for the tractor vehicle and the trailer vehicle on one of the brake-application energy reference value and axle load distribution of the tractor vehicle;
  from the brake-application energy reference value, the influencing factor, and the axle load distribution of the tractor vehicle, determining, using the at least one control unit, a loading state for one of the tractor vehicle, the trailer vehicle, and the vehicle combination; receiving, at the at least one control unit, an external brake request; and adapting, using the at least one control unit, brake force control of the trailer vehicle corresponding to the external brake request, based on the determined loading state and independently of any separate automatic load-dependent brake-force control.

2. The method as claimed in claim 1, wherein the loading state is at least one of a center of gravity location of the tractor vehicle, an axle load of the tractor vehicle, a plurality of axle loads of the tractor vehicle, and at least one axle load of the trailer vehicle.

3. The method as claimed in claim 1, wherein the loading state includes the axle loads of the tractor vehicle determined from the brake-application energy level for the tractor vehicle, the axle load distribution, and a permissible weight of the tractor vehicle.

4. The method as claimed in claim 1, further comprising determining at least one of a weight of the tractor vehicle, a weight of the trailer vehicle, and a total weight of the vehicle combination.

5. The method as claimed in claim 4, wherein the trailer vehicle has at least two trailer axles, and wherein the loading state includes the axle loads of the trailer vehicle determined from the brake-application energy level for the trailer vehicle, the axle load distribution, and the total weight of the vehicle combination.

6. The method as claimed in claim 1, wherein the deceleration setpoint value is determined for the entire vehicle combination.

7. The method as claimed in claim 1, wherein the external brake request comprises a deceleration setpoint value determined using a vehicle dynamics control unit, and wherein the at least one control unit comprises an electronic braking system control unit.

8. The method as claimed in claim 7, further comprising determining, for each of the at least one front axle and rear axle of the tractor vehicle, and the at least one trailer axle, axle-related deceleration setpoint values using the vehicle dynamics control unit, and outputting the axle-related deceleration setpoint values to the electronic braking system control unit.

9. The method as claimed in claim 8, wherein the tractor vehicle and the trailer vehicle include wheels, and wherein determining the axle-related deceleration setpoint values is effected wheel by wheel.

10. The method as claimed in claim 9, further comprising at least one of determining and controlling at least one of brake pressure setpoint values and the brake-application energy reference values of individual ones of the wheels based on at least one of steering angle, yaw rate, lateral acceleration, longitudinal acceleration, and lateral acceleration.

11. The method as claimed in claim 1, wherein determining a loading state for one of the tractor vehicle, the trailer vehicle, and the vehicle combination includes estimating the loading states of the tractor vehicle and the trailer vehicle from the brake-application energy levels using linear interpolation.

12. The method as claimed in claim 1, further comprising determining absolute axle loads of the at least one front axle and rear axle of the tractor vehicle and the at least one trailer axle by using at least one of a center of gravity location for the tractor vehicle, a center of gravity location for the trailer vehicle, and a center of gravity location for the vehicle combination.

* * * * *